United States Patent
Tokumura et al.

(10) Patent No.: US 9,381,966 B2
(45) Date of Patent: Jul. 5, 2016

(54) VEHICLE

(71) Applicant: HONDA MOTOR CO., LTD., Minato-Ku, Tokyo (JP)

(72) Inventors: Daisuke Tokumura, Wako (JP); Akira Omae, Wako (JP); Shigeki Sakaguchi, Wako (JP); Yoshihiro Inoue, Wako (JP); Yukari Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/449,502

(22) Filed: Aug. 1, 2014

(65) Prior Publication Data
US 2015/0042064 A1   Feb. 12, 2015

(30) Foreign Application Priority Data

Aug. 7, 2013 (JP) ................................. 2013-163820

(51) Int. Cl.
*B62J 15/00* (2006.01)
*B62K 11/04* (2006.01)

(52) U.S. Cl.
CPC . *B62J 15/00* (2013.01); *B62K 11/04* (2013.01)

(58) Field of Classification Search
CPC ...................................................... B62J 15/00
USPC ...................................... 280/281.1, 847, 283
See application file for complete search history.

(56) References Cited

U.S. PATENT DOCUMENTS

| 6,318,743 | B1 * | 11/2001 | Nakashima et al. ....... 280/152.1 |
| 7,882,919 | B2 | 2/2011 | Ito |
| 2005/0006169 | A1 * | 1/2005 | Michisaka et al. ............ 180/312 |
| 2008/0156558 | A1 * | 7/2008 | Otsubo et al. ................. 180/219 |
| 2012/0248734 | A1 * | 10/2012 | Matsushima et al. ...... 280/281.1 |
| 2012/0285762 | A1 * | 11/2012 | Weicheng ...................... 180/219 |
| 2012/0320612 | A1 * | 12/2012 | Yamakura et al. ............. 362/473 |

FOREIGN PATENT DOCUMENTS

| JP | S52-86154 U | 6/1977 |
| JP | S57-185690 U | 11/1982 |
| JP | 2011245972 A * | 12/2011 |
| JP | 5121526 B2 | 11/2012 |

* cited by examiner

*Primary Examiner* — Jacob Knutson
(74) *Attorney, Agent, or Firm* — Carrier Blackman & Associates, P.C.; Joseph P. Carrier; Jeffrey T. Gedeon

(57) ABSTRACT

A vehicle having a rear fender disposed above a rear wheel and formed of a plate member having an upward projecting shape, includes a cover member which covers a portion of a lower open part of the rear fender on a lateral side of the rear wheel. The rear fender and the cover member are provided as separate bodies to keep the moldability of the rear fender favorable. The mud-guard performance can be enhanced by covering part of the lower open part of the rear fender by the cover member. Such configuration provides a vehicle in which the mud-guard performance can be enhanced while keeping the moldability of a rear fender favorable.

11 Claims, 7 Drawing Sheets

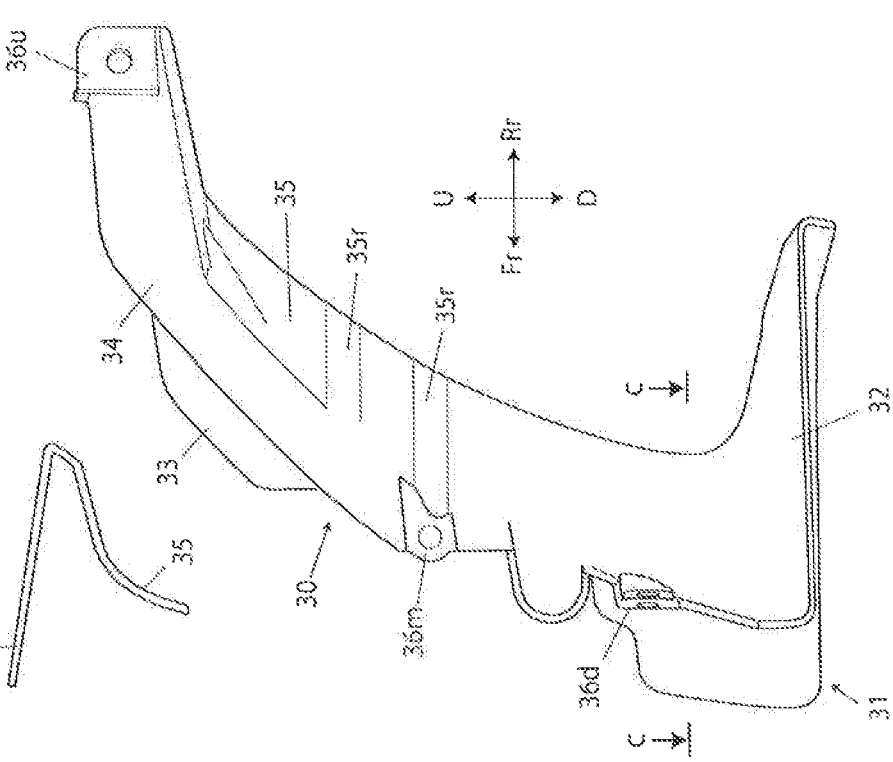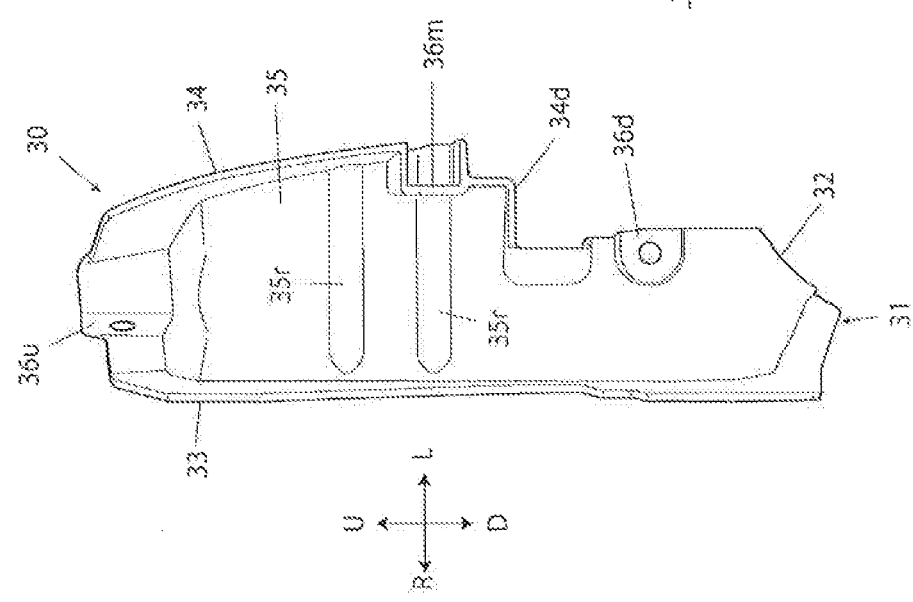

VEHICLE

CROSS-REFERENCE TO RELATED APPLICATIONS

The present invention claims priority under 35 USC 119 based on Japanese Patent Application No. 2013-163820, filed on Aug. 7, 2013. The entire subject matter of this priority document, including specification claims and drawings thereof, is incorporated by reference herein.

BACKGROUND OF THE INVENTION

1. Field of the Invention

The present invention relates to a vehicle having a rear fender. More particularly, the present invention relates to a motorcycle having a rear fender and a cover member which covers a lower part of the rear fender, and in which the cover member is formed separately from the rear fender.

2. Description of the Background Art

There is known, for example, as seen in the Japanese Patent No. 5121526, a motorcycle having a rear fender (47) that is disposed above a rear wheel (35) and is formed of a plate member having an upward projecting shape.

The rear fender is formed so as to have an upward projecting shape along the upper part of the rear wheel in a range from the front side of the rear wheel to the upper side thereof. Therefore, if it is molded by using a mold, demolding needs to be performed in the upward-downward direction. Accordingly, the lower open part is inevitably larger than the upper part. On the other hand, it is desired to reduce the size of the lower open part of the rear fender to enhance the mud-guard performance.

The present invention has been made in view of such a background. Accordingly, it is one of the objects of the present invention to provide a vehicle in which the mud-guard performance can be enhanced while keeping the moldability of the rear fender favorable.

SUMMARY OF THE INVENTION

In order to achieve the above objects, the present invention according to a first aspect thereof provides a vehicle including a rear fender disposed above a rear wheel of the vehicle, the rear fender being formed of a plate member having an upward projecting shape and having a lower open part; and a cover member that covers a portion of a lower open part of the rear fender on a lateral side of the rear wheel.

According to the first aspect of the present invention, the rear fender and the cover member are provided as separate bodies, i.e., the rear fender and the cover member are formed separately from each other, to keep the moldability of the rear fender favorable. Further, according to the present invention, the mud-guard performance is enhanced by covering part of the lower open part of the rear fender by the cover member.

The present invention according to a second aspect thereof includes a vehicle configuration in which the cover member is disposed on the upper side and the front side relative to a shaft of the rear wheel.

Such configuration can enhance the mud-guard performance with a small size of the cover member.

The present invention according to a third aspect thereof is characterized in that the vehicle is a motorcycle that allows a passenger to ride on the rear side of a driver, and the vehicle has a configuration in which a lower end of the cover member is disposed on the lower side relative to passenger steps.

With such configuration of vehicle, muddy water and so forth flowing along the cover member easily drops on the lower side relative to the passenger steps, which hinders the feet of the passenger from getting dirty.

The vehicle of the present invention according to a fourth aspect thereof further includes a muffler extending rearward on the lateral side of the rear wheel, and in which the cover member has an extension part extending rearward along the muffler between the rear wheel and the muffler.

Again with such configuration, muddy water and so forth running down along the cover member easily drops onto the inside of the muffler. Thus, dirt of the outside of the muffler can be suppressed so as to enhance the appearance of the vehicle.

The present invention according to a fifth aspect thereof is characterized in that the rear fender covers the upper side/portion of a vehicle body frame and the cover member covers the lower side/portion of the vehicle body frame.

Again, such configuration can prevent dirt from the vehicle body frame without complicating the structure of the rear fender and the cover member.

The present invention according to a sixth aspect thereof is characterized in that the rear wheel is supported by a cantilevered swing arm, and the cover member is disposed on the opposite side to the swing arm across the rear wheel.

Such configuration can enhance the mud-guard performance on the opposite side to the swing arm.

The present invention according to a seventh aspect thereof is characterized in that the cover member forms a housing box.

When such configuration is employed, part of the lower open part of the rear fender or a space below it can be effectively used as a housing/storage space.

The present invention according to an eighth aspect thereof is characterized in that the cover member includes an inside plate disposed inside of the cover member in the vehicle width direction, an outside plate disposed outside of the cover member in the vehicle width direction, and a connecting plate that connects these inside plate and outside plate and a rib extending along the vehicle width direction is made in the connecting plate.

With such configuration, the cover member has excellent attachability to the vehicle. Further, the attaching strength and the mud-guard performance can be enhanced by the inside plate, the outside plate, and the connecting plate.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 6A is a front view of cover member.

FIG. 6B is a left side view of a cover member.

FIG. 6C is an end view of cover member taken along line c-c in FIG. 6B.

DETAILED DESCRIPTION OF ILLUSTRATIVE EMBODIMENTS

Figure 1:
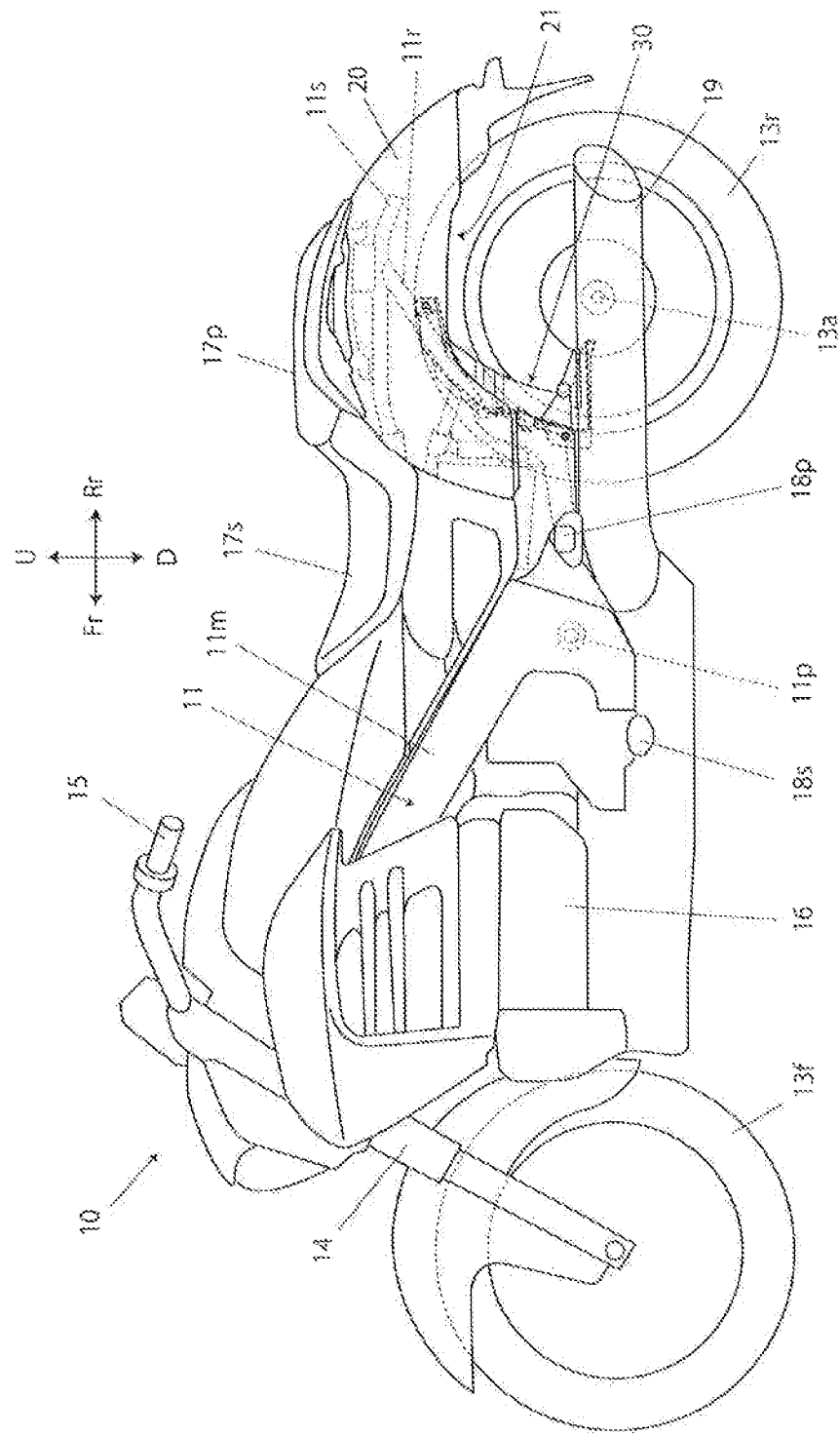
FIG. 1 is a left side view of an illustrative embodiment of a vehicle according to the present invention.
Figure 2:
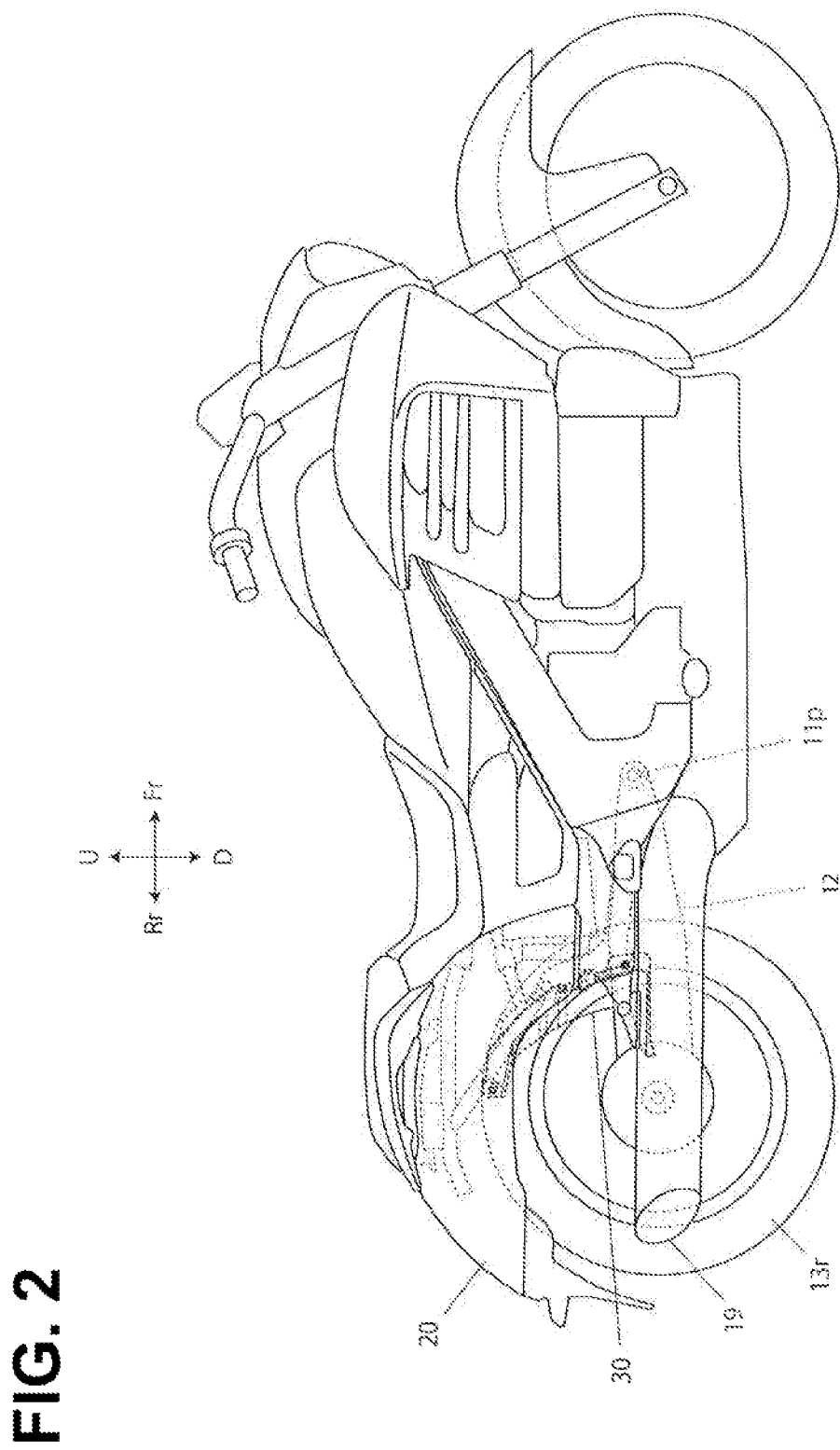
FIG. 2 is a right side view of the illustrative embodiment of a vehicle according to the present invention.

An illustrative embodiment of the present invention will be described hereinafter in detail with reference to the accompanying drawings. Throughout this description, relative terms like "upper", "lower", "above", "below", "front", "back", and the like are used in reference to a vantage point of an operator of the vehicle, seated on the driver's seat and facing forward. The drawings are seen in accordance with the orientation of symbols. In other words, in the following description, the front and rear directions, the left and right directions, and the upward and downward directions refer to directions from the viewpoint of the rider and the vehicle front direction, rear direction, left direction, right direction, upward direction, and downward direction are shown as Fr, Rr, L, R, U, and D, respectively, in the drawings according to need. It should be understood that these terms are used for purposes of illustration, and are not intended to limit the invention. In the respective drawings, the same part or equivalent part is given the same symbol.

As shown in FIGS. 1 to 5, a vehicle 10 of the present invention is a motorcycle. The motorcycle includes a vehicle body frame 11.

The vehicle body frame 11 includes a main frame 11m, a seat rail 11s extending rearwardly of the main frame 11m, and a rear frame 11r extending rearwardly of the main frame 11m and supporting the seat rail 11s.

At the rear part of the main frame 11m, a swing arm (cantilevered swing arm) 12 is swingably supported by a pivot shaft 11p in a cantilevered manner. At the rear end of the swing arm 12, a rear wheel 13r is rotatably supported by a shaft 13a.

A front fork 14 is steerably attached to the front portion of the main frame 11m. A front wheel 13f is rotatably attached to the lower end of the front fork 14. A steering handlebar 15 is attached to an upper part of the front fork 14.

A power unit (e.g. engine) 16 is mounted below the main frame 11m. The rear wheel 13r is rotationally driven by this power unit 16 via a drive shaft 12d (FIG. 5) that serves as power train means and is internally provided in the swing arm 12.

During operation of the vehicle 10, a driver (rider) sits on a driver seat 17s and puts his/her feet on driver steps 18s and can drive the vehicle 10 by holding the steering handlebar 15. As stated above, the vehicle 10 is a motorcycle which allows a passenger to ride on the rear side of the driver. The motorcycle includes a passenger seat 17p rearward of the driver seat 17s, and also includes passenger steps 18p rearward of the driver steps 18s.

The vehicle 10 includes a rear fender 20 disposed above the rear wheel 13r. The rear fender 20 is formed of a plate member having an upward projecting shape. The vehicle further includes a cover member 30 that covers a portion of a lower open part 21 of the rear fender 20 on a lateral side of the rear wheel 13r.

According to the vehicle 10 of the present application, the rear fender 20 and the cover member 30 are provided as separate bodies to keep the moldability of the rear fender 20 favorable. In other words, the rear fender 20 and the cover member 30 are formed separately from each other. The mud-guard performance can be enhanced by covering part of the lower open part 21 of the rear fender 20 by the cover member 30.

Figure 5:
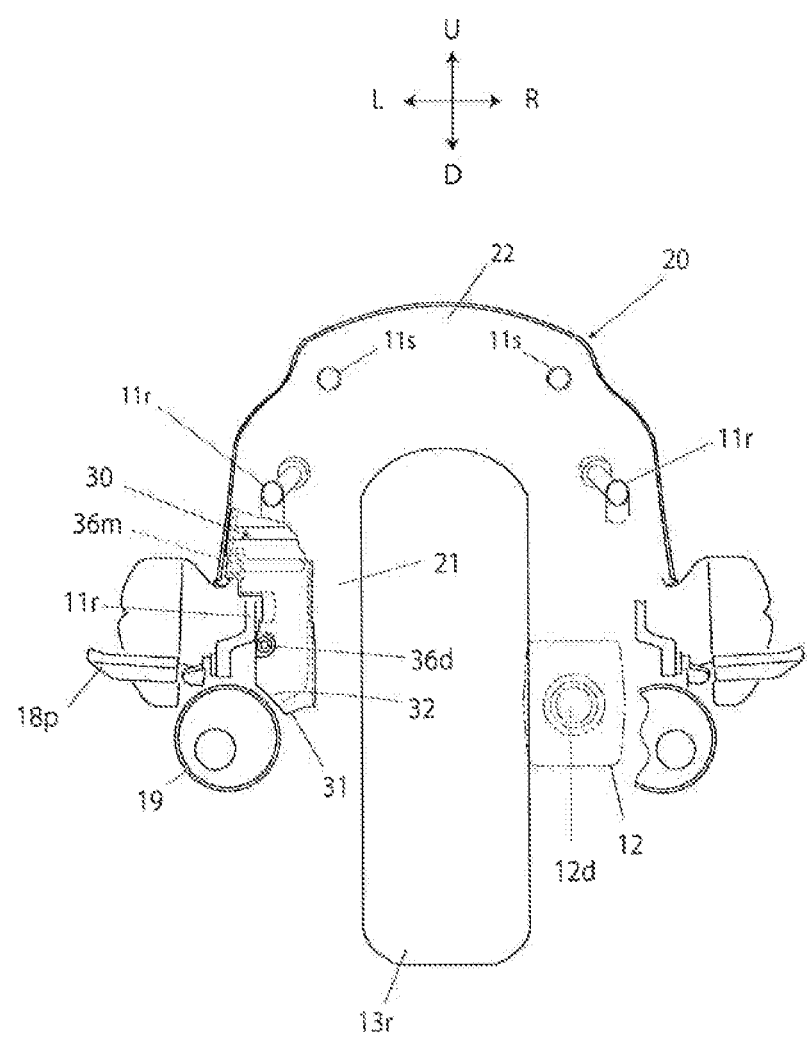
FIG. 5 is a partially-omitted sectional view along line 5-5 in FIG. 3.

The rear fender 20 is so formed as to have an upward projecting shape along the upper part of the rear wheel 13r in a range from the front side of the rear wheel 13r to the upper side thereof. The rear fender 20 is molded by using a mold and demolding needs to be performed in the upward-downward direction. Therefore, as shown in FIG. 5 for example, the lower open part 21 is inevitably larger than an upper part 22.

The larger size of the lower open part 21 possibly leads to lower mud-guard performance. However, according to the present invention, by providing the cover member 30 as a body separate from the rear fender 20, the mud-guard performance can be enhanced while ensuring of the moldability of the rear fender 20.

Figure 3:
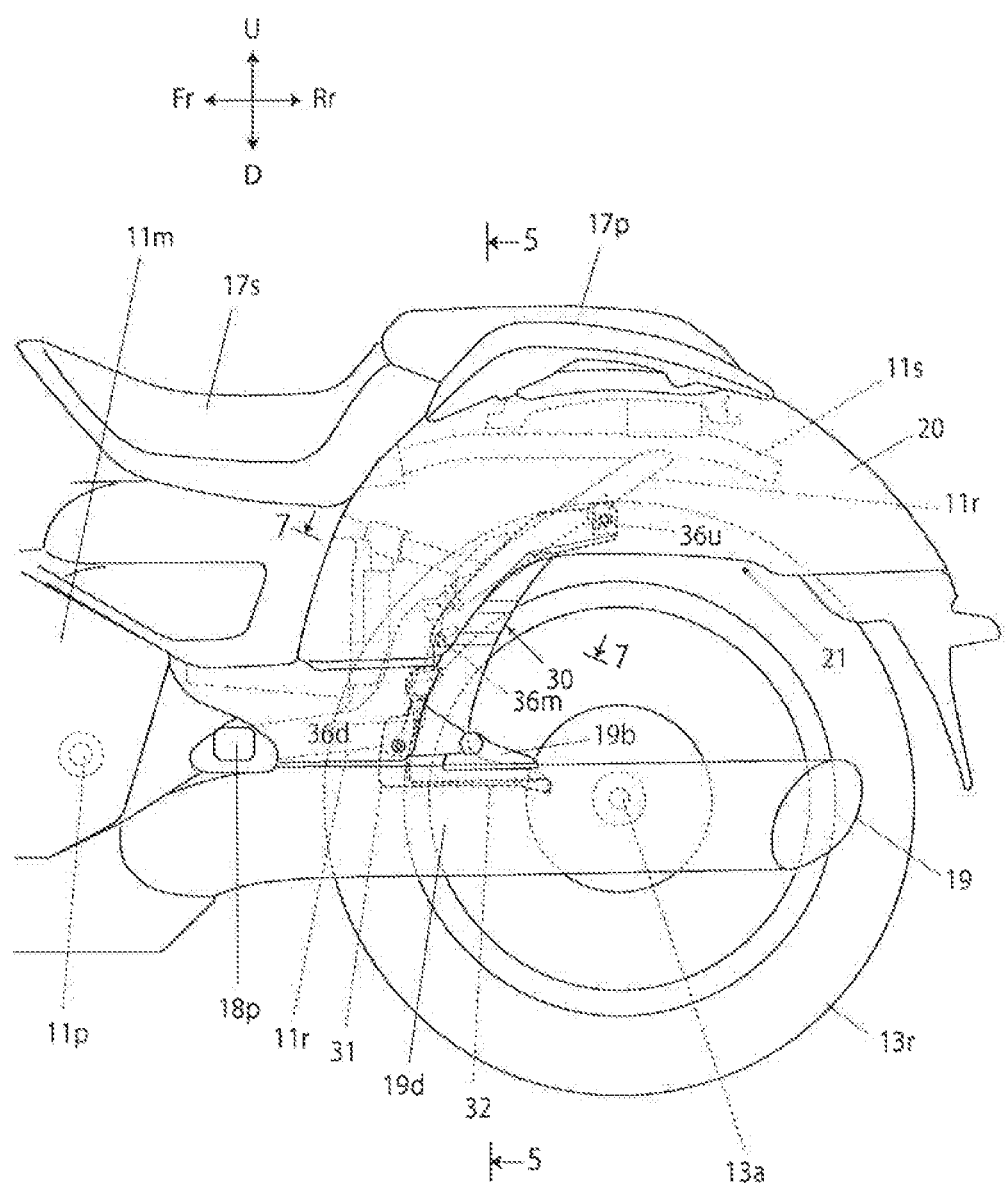
FIG. 3 is a partial enlarged view of FIG. 1.

As shown in FIG. 3, the cover member 30 is disposed on the upper side and the front side relative to the shaft 13a of the rear wheel 13r.

Such configuration enhances the mud-guard performance while requiring the cover member 30 of a small size.

It is also possible for the cover member 30 to be provided on the upper side and the rear side relative to the shaft 13a of the rear wheel 13r and to be provided in substantially the whole area of the upper side.

However, when the cover member 30 is provided on the upper side and the rear side, there is a possibility that it becomes impossible to effectively suppress muddy water and so forth kicked up or thrown up by the rear wheel 13r toward the upper front side obliquely.

Furthermore, when the cover member 30 is provided in substantially the whole area of the upper side, the size of the cover member 30 becomes large.

In contrast, according to the present invention, the cover member 30 is disposed on the upper side and the front side relative to the shaft 13a supporting the rear wheel 13r. That is, the cover member is disposed in the area between the positions substantially corresponding to the direction of nine of the clock to the position substantially corresponding to the direction of twelve of the clock. Thus, the mud-guard performance can be enhanced with the cover member 30 of a small size.

Figure 4:
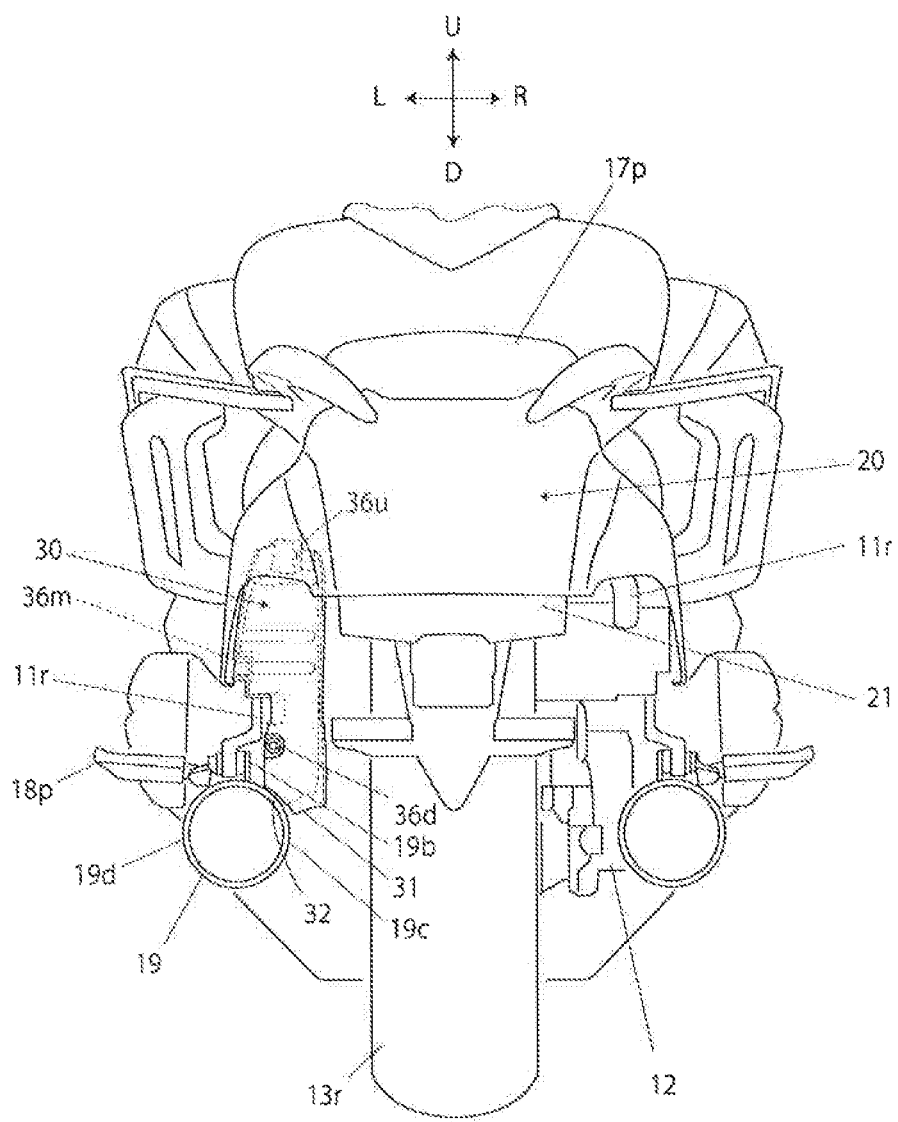
FIG. 4 is a rear view of FIG. 3.

As shown in FIGS. 3 and 4, a lower end 31 of the cover member 30 is disposed on the lower side relative to the passenger steps 18p. That is, the lower end 31 of the cover member 30 is disposed at a position located below the passenger steps 18p.

By employing such configuration, muddy water and so forth flowing along the cover member 30 easily drops on the lower side relative to the passenger steps 18p, which hinders the feet of the passenger from getting dirty.

As shown in FIGS. 3 and 4, the vehicle 10 further includes a muffler 19 extending rearward on a lateral side of the rear wheel 13r. The cover member 30 has an extension part 32 extending rearward along the muffler 19 between the rear wheel 13r and the muffler 19.

When such configuration is employed, muddy water and so forth running down along the cover member 30 easily drops onto an inward portion 19c of the muffler 19. Thus, dirt of an outside 19d of the muffler 19 can be suppressed to enhance the appearance of the vehicle 10.

The muffler 19 is fixed to the rear frame 11r with the intermediary of a bracket 19b and the extension part 32 is disposed inwardly relative to the bracket 19b. Therefore, dirt of the outside of the bracket 19b can also be suppressed.

As shown in FIGS. 3 and 5, the rear fender 20 covers the upper side of the vehicle body frame 11 of the vehicle 10 (see, for example, the seat rail 11s and the rear frame 11r as part of the vehicle body frame 11 in FIGS. 3 and 5) and the cover member 30 covers the lower side of the vehicle body frame 11 (see, for example, rear frame 11r in FIGS. 3 and 5).

Again, such configuration can suppress dirt from the vehicle body frame 11 without complicating the structure of the rear fender 20 and the cover member 30.

As shown in FIGS. 4 and 5, the cover member 30 is disposed on the opposite side to the swing arm 12 across the rear wheel 13r.

Such configuration can enhance the mud-guard performance on the opposite side to the swing arm 12.

Figure 7:
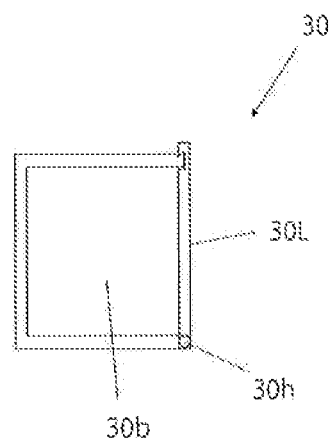
FIG. 7 is a diagram showing a modification example and is a schematic diagram equivalent to a section along line 7-7 in FIG. 3.

As shown in FIG. 7, it is also possible for the cover member 30 to be formed in a box-shaped, that is, as a housing box 30b. If such box-shaped configuration is employed for the cover member 30, part of the lower open part 21 of the rear fender 20 or a space below it can be effectively used as a housing/storage space.

The box-shaped cover member 30, as shown in FIG. 7, includes a lid 30L which is formed such that the lid 30L is openable/closable via a hinge 30h.

As shown in FIGS. 6A-6C, the cover member 30 includes an inside plate 33 disposed inside of the cover member 30 in the vehicle width direction, an outside plate 34 disposed outside of the cover member 30 in the vehicle width direction, and a connecting plate 35 that connects the inside plate 33 and the outside plate 34. A plurality of ribs 35r extending along the vehicle width direction is formed in the connecting plate 35.

If such configuration is employed, the cover member 30 excellent in the attachability to the vehicle 10. The attaching strength, and the mud-guard performance can be enhanced by the inside plate 33, the outside plate 34, and the connecting plate 35.

As shown in FIG. 6A, an upper fixing part 36u is provided between the inside plate 33 and the outside plate 34 at an upper portion in the upward-downward direction of the cover member 30. Furthermore, a middle fixing part 36m is provided in the outside plate 34 at a middle portion and a lower fixing part 36d is provided in the connecting plate 35 at a lower portion. As shown in FIGS. 3 and 4, the respective fixing parts 36u, 36m, and 36d are fastened and fixed to the rear frame 11r by bolts (only part thereof is shown) to thereby be attached to the vehicle body frame 11 (see, for example, the rear frame 11r in FIGS. 3 and 4).

As shown in FIGS. 6A-6B, in the cover member 30, the outside plate 34 is provided only at the upper part of the cover member 30, i.e., at a lower end 34d of the outside plate 34; and is not provided at the lower part. As shown in FIG. 6C, the lower part is formed by the inside plate 33 and the connecting plate 35.

The illustrative embodiment of the present invention is described above. However, the present invention is not limited to the illustrated embodiment and can be carried out with arbitrary modifications within the scope of the gist of the present invention. In other words, although the present invention has been described herein with respect to one or more of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

DESCRIPTION OF REFERENCE SYMBOLS

10: Vehicle, 11: Vehicle body frame, 12: Cantilevered swing arm, 13r: Rear wheel, 13a: Shaft, 18p: Passenger step, 19: Muffler, 20: Rear fender, 21: Lower open part, 30: Cover member, 33: Inside plate, 34: Outside plate, 35: Connecting plate, 35r: Rib.

What is claimed is:

1. A vehicle comprising
    a rear wheel;
    a rear fender disposed above the rear wheel, said rear fender being formed of a plate member having an upward projecting shape and having a lower open part;
    a cover member which covers a portion of said lower open part of the rear fender on a lateral side of the rear wheel; and
    a vehicle body frame,
    wherein the rear fender covers an upper portion of said vehicle body frame;
    wherein the cover member covers a lower side of the vehicle body frame;
    wherein the vehicle is a motorcycle comprising a driver seat, a passenger seat disposed rearward of the driver seat, driver steps, and passenger steps arranged rearward of the driver steps;
    wherein a lower end of the cover member is disposed at a position located below the passenger steps; and the cover member is disposed laterally between an inner periphery of a muffler and the rear wheel in a vehicle width direction.

2. The vehicle according to claim 1, further comprising a shaft supporting said rear wheel;
    wherein the cover member is disposed on an upper side and a front side relative to said shaft supporting the rear wheel.

3. The vehicle according to claim 1, wherein the muffler extends rearward on the lateral side of the rear wheel;
    wherein the cover member comprises an extension part extending rearward along the muffler between the rear wheel and the muffler; and
    the extension part extending rearward along the muffler overlaps at least with the muffler in a vehicle body side view, and the extension part is disposed laterally inward toward a centerline in the vehicle width direction relative to the muffler.

4. The vehicle according to claim 1, further comprising a cantilevered swing arm;
    wherein the rear wheel is supported by the cantilevered swing arm and the cover member is disposed on an opposite side to the swing arm across the rear wheel.

5. The vehicle according to claim 1, wherein the cover member forms a housing box.

6. The vehicle according to claim 1,
    wherein the cover member comprises an inside plate, an outside plate,
    a connecting plate that connects the inside plate and the outside plate, and
    a rib extending along the vehicle width direction and being formed in the connecting plate.

7. The vehicle according to claim 6, wherein the rear fender and the cover member are formed separately from each other.

8. The vehicle according to claim 2, wherein the muffler extends rearward on the lateral side of the rear wheel;
    wherein the cover member comprises an extension part extending rearward along the muffler between the rear wheel and the muffler; and
    the extension part extending rearward along the muffler overlaps at least with the muffler in a vehicle body side view, and the extension part is disposed laterally inward toward a centerline in the vehicle width direction relative to the muffler.

9. The vehicle according to claim 2, further comprising a cantilevered swing arm;
wherein the rear wheel is supported by the cantilevered swing arm and the cover member is disposed on an opposite side to the swing arm across the rear wheel.

10. The vehicle according to claim 2, wherein the cover member forms a housing box.

11. The vehicle according to claim 2,
wherein the cover member comprises an inside plate, an outside plate,
a connecting plate that connects the inside plate and the outside plate, and
a rib extending along the vehicle width direction and being formed in the connecting plate.

* * * * *